(12) United States Patent
Martin et al.

(10) Patent No.: US 10,660,131 B2
(45) Date of Patent: *May 19, 2020

(54) COMMUNICATIONS DEVICE AND METHOD COLLISION AVOIDANCE ON SHARED COMMUNICATIONS RESOURCES

(71) Applicant: SONY CORPORATION, Tokyo (JP)

(72) Inventors: Brian Alexander Martin, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,629

(22) Filed: Oct. 11, 2018

(65) Prior Publication Data

US 2019/0045545 A1   Feb. 7, 2019

Related U.S. Application Data

(63) Continuation of application No. 15/110,149, filed as application No. PCT/EP2014/079338 on Dec. 24, 2014, now Pat. No. 10,111,251.

(30) Foreign Application Priority Data

Jan. 30, 2014 (EP) .................................. 14153530

(51) Int. Cl.
*H04W 74/08*   (2009.01)
*H04W 76/14*   (2018.01)
*H04W 72/04*   (2009.01)

(52) U.S. Cl.
CPC ....... *H04W 74/0816* (2013.01); *H04W 72/04* (2013.01); *H04W 74/08* (2013.01); *H04W 76/14* (2018.02)

(58) Field of Classification Search
CPC . H04W 74/0816; H04W 76/14; H04W 72/04; H04W 74/08
See application file for complete search history.

(56) References Cited

U.S. PATENT DOCUMENTS 10,111,251 B2 * 10/2018 Martin .................. H04W 74/08
2009/0019168 A1    1/2009 Wu et al.
(Continued)

FOREIGN PATENT DOCUMENTS

| CN | 102318421 A | 1/2012 |
| WO | 2009/009537 A2 | 1/2009 |
| WO | 2013/153546 A1 | 10/2013 |

OTHER PUBLICATIONS

Chinese Office Action dated Jan. 9, 2019, issued in corresponding Chinese Patent Application No. 2014800746138.
(Continued)

*Primary Examiner* — Walli Z Butt
(74) *Attorney, Agent, or Firm* — Xsensus LLP

(57) ABSTRACT

A communications device can identify one or more sections of plural predetermined sections, divided into time-units, of shared communications resources of a wireless access interface for transmitting data signals to one or more other communications device. The communications device detects whether another of the one or more communications devices are transmitting signals in one or more of the identified sections of the shared communications resources in at least one time divided unit, and if signals transmitted by another of the communications devices are not detected, the device transmits signals in the identified one or more predetermined sections of the shared communications resources for at least one of the time divided units, and then, after a collision avoidance time, detects for at least one subsequent time unit whether another of the one or more communications devices
(Continued)

transmits signals in one or more of the identified sections of the shared communications resources.

20 Claims, 12 Drawing Sheets

(56) References Cited

U.S. PATENT DOCUMENTS

| | | | |
|---|---|---|---|
| 2010/0202400 A1* | 8/2010 | Richardson | H04W 8/005 370/330 |
| 2012/0265818 A1 | 10/2012 | Van Phan et al. | |
| 2012/0300662 A1 | 11/2012 | Wang et al. | |
| 2013/0012221 A1 | 1/2013 | Zou et al. | |
| 2013/0059583 A1 | 3/2013 | Van Phan et al. | |
| 2013/0064187 A1* | 3/2013 | Patil | H04W 74/0858 370/329 |
| 2013/0150051 A1 | 6/2013 | Van Phan et al. | |
| 2013/0170387 A1 | 7/2013 | Wang et al. | |
| 2014/0301326 A1 | 10/2014 | Palil et al. | |
| 2016/0057604 A1* | 2/2016 | Luo | H04W 8/005 370/330 |
| 2016/0338127 A1 | 11/2016 | Matsumoto et al. | |
| 2016/0374135 A1 | 12/2016 | Martin | |

OTHER PUBLICATIONS

"3rd Generation Partnership Project; Technical Specification Group Core Network and Terminals; Interworking Between the Public Land Mobile Network (PLMN) Supporting Packet Based Services and Packet Data Networks (PDN)," 3GPP TS 29.061, V10.0.0, Technical Specification, Release 10, pp. 1-155 (Sep. 2010).

"3rd Generation Partnership Project; Technical Specification Group Services and System Aspects; Study on Architecture Enhancements to Support Proximity-based Services (ProSe)," 3GPP TR 23-703, V1 .0.0, Technical Report, Release 12, pp. 1-275 (Dec. 2013).

"Agreements from TSG RAN on Work on Public Safety Related Use Cases in Release 12," Vodafone, US Department of Commerce, UK Home Office, Motorola Solutions, General Dynamics Broadband UK, Telefonica, Ericsson, NSN, Alcatel-Lucent, TSG RAN Meeting #61, RP-13177, pp. 1-6 (Sep. 3-6, 2013).

Asadi, A., et al., "A Survey on Device-to-Device Communication in Cellular Networks," pp. 1-18 (2014).

"CSMA/CA based resource selection," 3GPP TSG-RAN WG2 #84 R2-133840, Samsung, pp. 1-4 (Nov. 11-15, 2013).

"D2D Scheduling Procedure," Ericsson, 3GPP TSG-RAN WG2 #84, Tdoc R2-134238, pp. 1-7 (Nov. 11-15, 2013).

Holma, H., and Toskala, A., "LTE for UMTS OFDMA and SC-FDMA Based Radio Access," pp. 1-4 (2009).

Lin, X., et al., "Spectrum Sharing for Device-to-Device Communication in Cellular Networks," pp. 1-14 (2014).

"Medium Access for D2D Communication," LG Electronics Inc, 3GPP TSG-RAN WG2 #84, R2-134426, pp. 1-8 (Nov. 11-15, 2013).

"Network control for Public Safety D2D Communications," Orange, Huawei, HiSilicon, Telecom Italia, 3GPP TSG-RAN WG2 Meeting# 84, R2-133990, pp. 1-5 (Nov. 11-15, 2013).

"Possible Mechanisms for Resource Selection in Connectionless D2D Voice Communication," General Dynamics Broadband UK, 3GPP TSG-RAN2#84, R2-134248, pp. 1-9 (Nov. 11-15, 2013).

"Simulation results for D2D voice services using connectionless approach," General Dynamics Broadband UK, 3GPP TSG-RAN2#84, R2-134431, pp. 1-6 (Nov. 11-15, 2013).

"Study on LTE Device to Device Proximity Services," Qualcomm Incorporated, 3GPP TSG RAN Meeting #58, RP-122009, pp. 1-6 (Dec. 4-7, 2012).

"The Synchronizing Central Node for Out of Coverage D2D Communication," General Dynamics Broadband UK, 3GPP TSG-RAN2#84, R2-134246, pp. 1- 3 (Nov. 11-15, 2013).

Tsolkas, D., et al., "Enabling D2D Communications in LTE Networks," 2013 IEEE 24th International Symposium on Personal, Indoor and Mobile Radio Communications: Mobile and Wireless Networks, pp. 2846-2850 (2013).

Xiaogang, R., et al., "D2D Resource Allocation under the Control of BS," DCN 16-13-0123-02-000n, Uploaded to IEEE on Aug. 10, 2013, pp. 1-7.

Zulhasnine, M., et al., "Efficient Resource Allocation for Device-to-Device Communication Underlaying LTE Network," pp. 1-8 (2010).

International Search Report and Written Opinion for International Application No. PCT/EP2014/079338, dated Apr. 1, 2015.

* cited by examiner

Another potential arrangement
FIG. 9

Possible implementation of contention resolution phase

Possible implementation of contention resolution phase

COMMUNICATIONS DEVICE AND METHOD COLLISION AVOIDANCE ON SHARED COMMUNICATIONS RESOURCES

CROSS-REFERENCE TO RELATED APPLICATIONS

This application is a continuation of Ser. No. 15/110,149 filed Jul. 7, 2016, which is a National Stage Entry of International Patent Application No. PCT/EP2014/079338 filed Dec. 24, 2014, and claims priority to European Patent Application 14 153 530.2, filed in the European Patent Office on Jan. 31, 2014, the entire contents of each of which being incorporated herein by reference.

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution to public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications devices.

SUMMARY OF THE DISCLOSURE

According to a first example embodiment of the present technique there is provided a method of communicating using a communications device via a wireless access interface to perform device-to-device communications. The method comprises identifying one or more sections of a plurality of predetermined sections of shared communications resources of the wireless access interface for transmitting signals representing data to one or more other communications device. The plurality of predetermined sections of the shared communications resources of the wireless access interface may be divided into time-units. The method includes, in a first phase, detecting whether another of the one or more communications devices is transmitting signals in one or more of the identified sections of the shared communications resources in at least one time divided unit, and if signals transmitted by another of the communications devices are not detected, in a second phase, transmitting signals in the identified one or more predetermined sections of the shared communications resources for at least one of the time divided units. According to the method there is then a step of detecting, after a collision avoidance time of at least one subsequent time unit, whether another of the one or more communications devices transmits signals in one or more of the identified sections of the shared communications resources, and if signals transmitted by another of the communications devices are not detected for the at least one subsequent time unit, transmitting signals in the one or more identified sections of the shared communications resources, the signals representing the data being communicated to the one or more other communications devices.

Example embodiments of the present technique can provide an arrangement in which contention between communications devices for access to shared communications resources is reduced by combining a listening phase with a transmission and listening phase before transmitting signals representing data via those shared communications resources of a wireless access interface. The communications device identifies communications resources from the shared communications resources which it needs to transmit data to one or more other communications devices which may form a group of devices. Having identified the communications resources of the shared communications resources of the wireless access interface, the communications device monitors those identified communications resource to try to detect, during a listening phase, whether another device transmits signals in any of those communications resources. If the communications device does detect that another communications device is transmitting signals in the identified resources then it can either wait for some arbitrary back-off time or attempt to find an alternative selection of the shared communications resources. If the communications device does not detect that another device is transmitting signals in communications resources which is has identified then it starts a second phase in which it transmits signals in those identified communications resources. The communications device then stops transmitting after a collision avoidance time and again listens to those identified communications resources to detect whether another communications device is transmitting in the identified communications resources. This second listening phase, after the collision avoidance time, therefore is arranged to detect a situation in which another communications devices has contemporaneously performed a listening phase and then began to transmit in the same communications resource. By for example generating the collision avoidance time pseudo-randomly or providing each of the communications devices of a group with a different collision avoidance time, the listening times can be arranged to be either random or offset. As a result, the probability of collision between two communications devices transmitting at exactly the same time, so that their contemporaneous transmissions cannot be detected, is reduced. This is because communications devices in the group of communications devices performing D2D communications, which are contending for the shared resources have different collision avoidance times and transmit during the collision avoidance time. As such two communications devices will be able to detect that the other is contending for the same resources because each UE will stop transmitting to detect transmissions from other UEs at different times. Therefore the communications devices can detect collisions.

If the communications device does not detect that another communications device is transmitting in the identified communications resources after the second listening phase then it transmits signals representing the data in the identified communications resources.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which:

FIG. 9 is a schematic block diagram of a further illustration of a wireless access interface for supporting device to device communications in accordance with the present technique.

DESCRIPTION OF EXAMPLE EMBODIMENTS

Conventional Communications System

Figure 1:
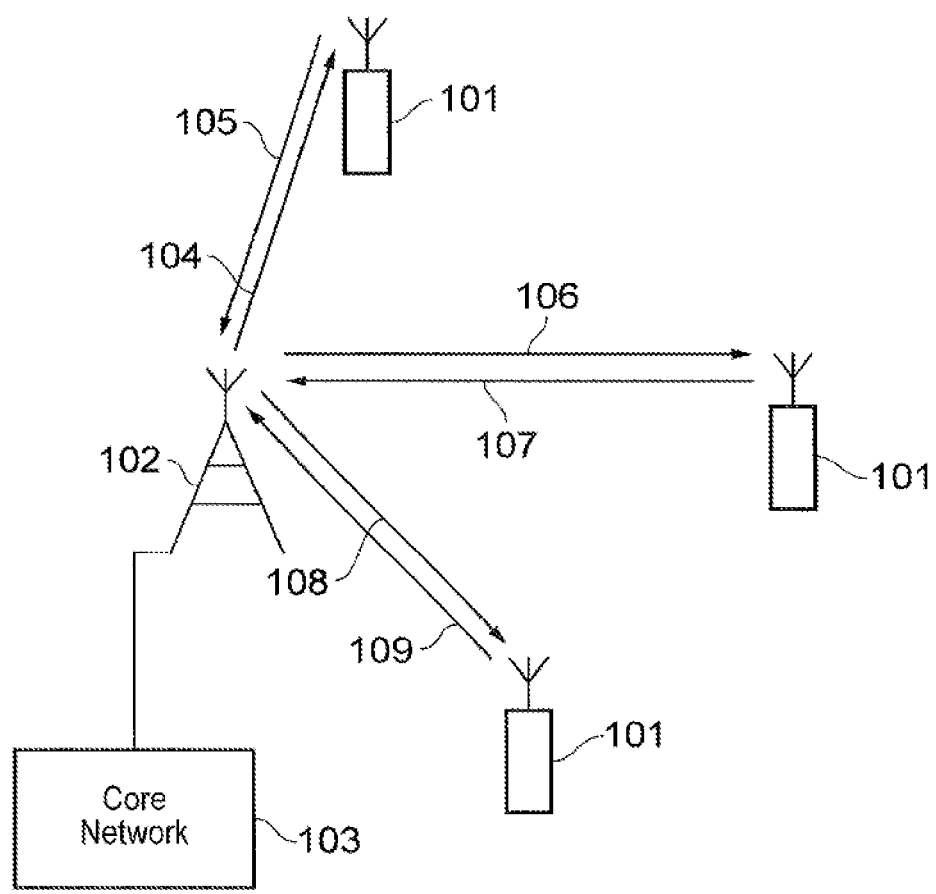
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
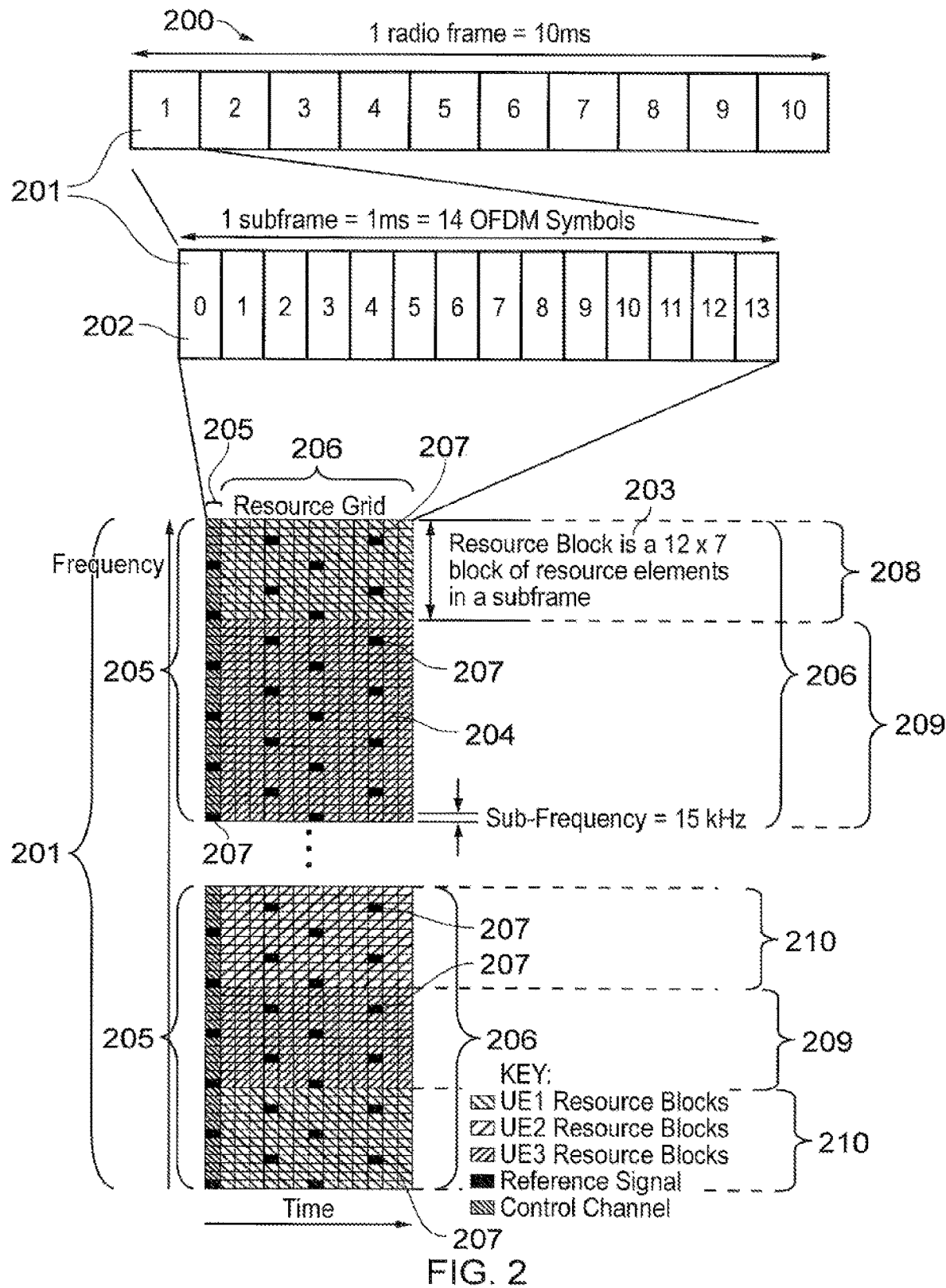
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDSCH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
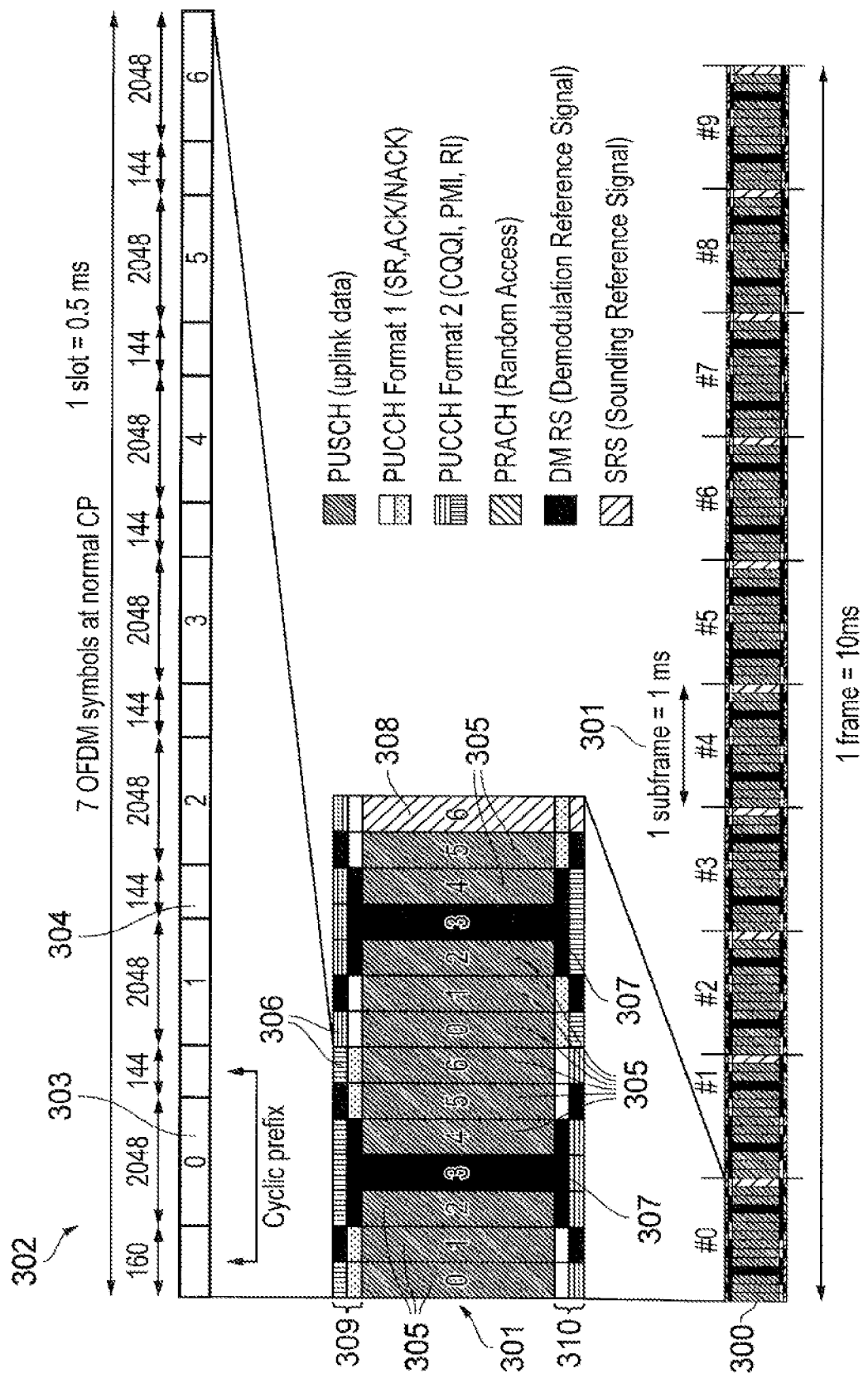
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
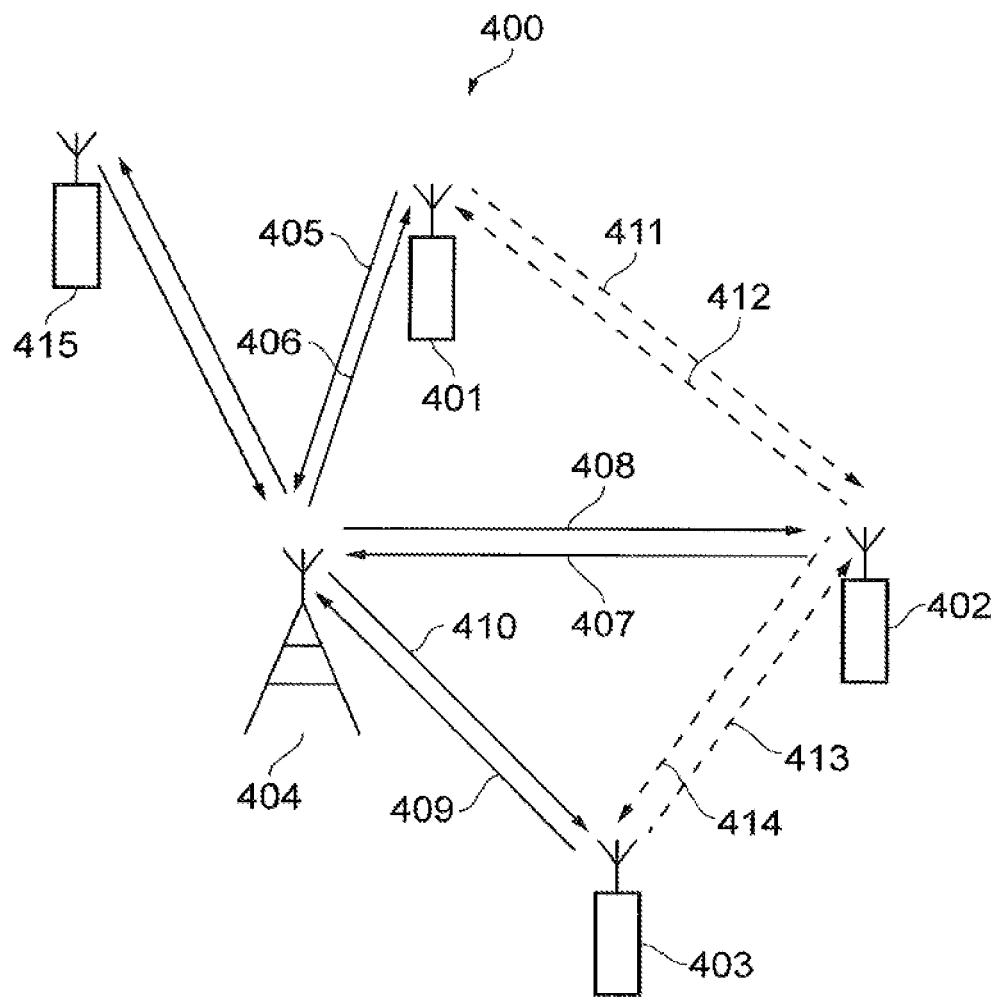
FIG. 4 provides a schematic diagram of a mobile communications system in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403 it may then proceed to establishing a D2D communications link with UE 403.

Previously Proposed D2D Systems

It has previously been proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:

[2] R2-133990, Network control for Public Safety D2D Communications; Orange,
Huawei, ffiSilicon, Telecom Italia
[3] R2-134246. The Synchronizing Central Node for Out of Coverage D2D Communication; General Dynamics Broadband UK
[4] R2-134426, Medium Access for D2D communication; LG Electronics Inc In another arrangement one of the UEs of the group first sends a scheduling assignment, and then transmits data without a central scheduling UE or controlling entity controlling the transmissions. The following disclosures provide examples of this de-centralised arrangement:

[5] R2-134238. D2D Scheduling Procedure; Ericsson;
[6] R2-134248, Possible mechanisms for resource selection in connectionless D2D voice communication; General Dynamics Broadband UK;
[7] R2-134431, Simulation results for D2D voice services using connectionless approach
General Dynamics Broadband UK In particular, the last two contributions listed above, R2-134248 [6], R2-134431 [7], disclose the use of a scheduling channel, used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed in [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

As a result of the possible approaches to the organisation of a D2D devices and networks, a number of scenarios may arise. A selection of example scenarios are provided by FIGS. 5a to 5d where each may cause different problems regarding the allocation of resources, the operation of D2D communications alongside conventional LTE communication and the movement of D2D capable devices between coverage areas provided by eNodeBs.

Figure 5A:
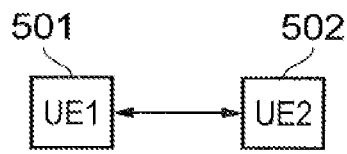
FIGS. 5a to 5d provides schematics diagrams of example device-to-device communications scenarios.

In FIG. 5a UEs 501 and 502 are outside of a coverage area of an eNodeB, consequently, the D2D devices may communicate with little or no regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
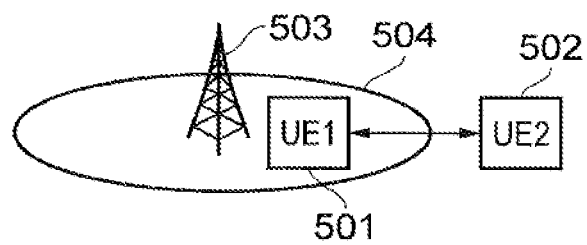

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 503, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE may for example perform resource allocation and then inform the eNodeB of the resources being utilised for D2D communications. The eNodeB will then reserve these resources for D2D communications.

Figure 5C:
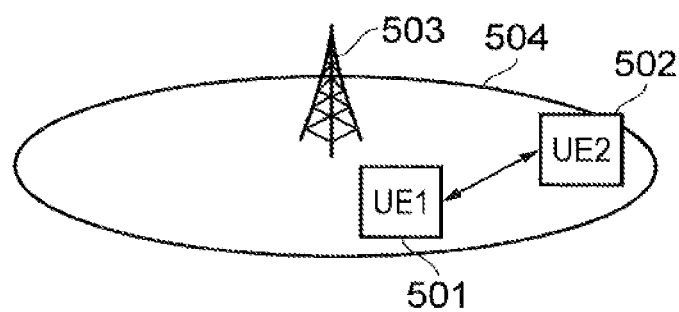

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
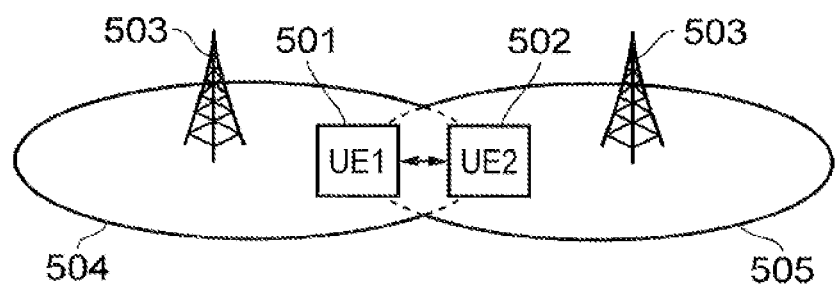

In FIG. 5d a fourth more complex D2D scenario is illustrated, where UE 501 and UE 502 are each within the coverage areas 504 505 of different eNodeB s 503 and 504 respectively. As for the scenarios of FIGS. 5b and 5c, coordination between the UEs performing D2D communications will be required if interference between D2D communications and conventional LTE communications is to be avoided. However, the presence of two eNodeB requires that resource allocations by the eNodeBs within the coverage areas 504 and 505 are required to be coordinated around the D2D resources allocations.

FIGS. 5a to 5d illustrates just four of a large number of possible D2D usage scenarios, where further scenarios may be formed from combinations of those illustrated in FIG. 5a to 5d. For example, two UEs communicating as shown in FIG. 5a may move into the usage scenario of FIG. 5d such that there are two groups of UEs performing D2D communications in the coverage areas of two eNodeBs.

Once a D2D communications link is established resources of the wireless access interface are required to be allocated to the D2D link. As described above it is likely that D2D communication will take place in spectrum allocated for LTE networks, consequently it has been previously proposed that when within a coverage area of an LTE network, D2D transmission are performed in the uplink spectrum and that SC-FDM is used . . . . Furthermore, as one of the motivating factors behind D2D communication is the increase in capacity that may result, utilising the downlink spectrum for D2D communications is not appropriate.

As previously described it would be desirable to provide an arrangement for D2D communications which do not significantly adversely affect conventional LTE communications when within a coverage area of one or more eNodeBs. To accomplish D2D communications in such situations, coordination is required between the UEs wishing the preform D2D communications and the serving eNodeB or predetermined knowledge of D2D resources are required, so that D2D and conventional LTE communications are not scheduled for a same set of resources. Furthermore, because D2D communications may coexist with conventional communications within a system, it is also desirable that D2D resource allocations and transmission do not interfere and are transparent to other UEs so any adverse effects on other UEs are reduced. However, generally a technical problem can be seen to provide an arrangement for performing D2D resource allocation, which reduces resource usage for scheduling information, and frees up resources for D2D data traffic. Accordingly scheduling assignment is desirable to the effect that the available communications resources can be allocated to the communications devices of the group.

Improved Device-to-Device Communications

Example embodiments of the present technique can provide an arrangement in which D2D communications can be performed between one or more communications devices which may form a group of communications devices. The group of communications devices may be arranged to perform D2D communication without requiring a central entity to control the transmission of signals from the communications devices to the other communications devices of the group. According to the present technique, a wireless access interface is provided which includes a scheduling assignment region or channel in which scheduling assignment messages may be transmitted in a plurality of sections of communications resources. Each of the plurality of communications resource has a corresponding section of resources of a shared communications channel. The transmission of a scheduling assignment message in one of the sections of the scheduling assignment region can provide an indication to all of the other devices in a group that a communications device wishes to transmit signals representing data in a corresponding section of the shared communications resources.

As will be understood from the following examples, a scheduling assignment region or channel within a wireless access interface provides communications devices with a facility to transmit scheduling assignment messages in order to reserve corresponding sections of communications resources of a shared communications channel. A communications device can transmit data to other communications devices in a group by transmitting a scheduling assignment message in one or more of the plurality of predetermined sections of the scheduling assignment region. The transmission of the scheduling assignment message in a section of the scheduling assignment region informs the other devices of the group that a communications device will transmit signals representing data in at least one corresponding section of the shared communications channel. Other devices in the group which are not transmitting therefore monitor the scheduling assignment region and if they detect a scheduling assignment message transmitted in one or more sections of the scheduling assignment region then attempt to detect and decode signals transmitted in a corresponding section or sections of the shared communications resources channel. Accordingly a group of communications device can perform D2D communications with improved resource efficiency.

In some examples, the scheduling assignment region is provided periodically in time divided units separated by one or more other time divided units which provide the shared communications resources. Accordingly a power saving advantage is provided to communications devices of the group because the devices power up their receivers to receive the scheduling assignment region periodically, the period corresponding to the relative ratio of the time unit in which the scheduling assignment region is provided with respect to the time unit or units in which the shared communications resources are provided.

Figure 6:
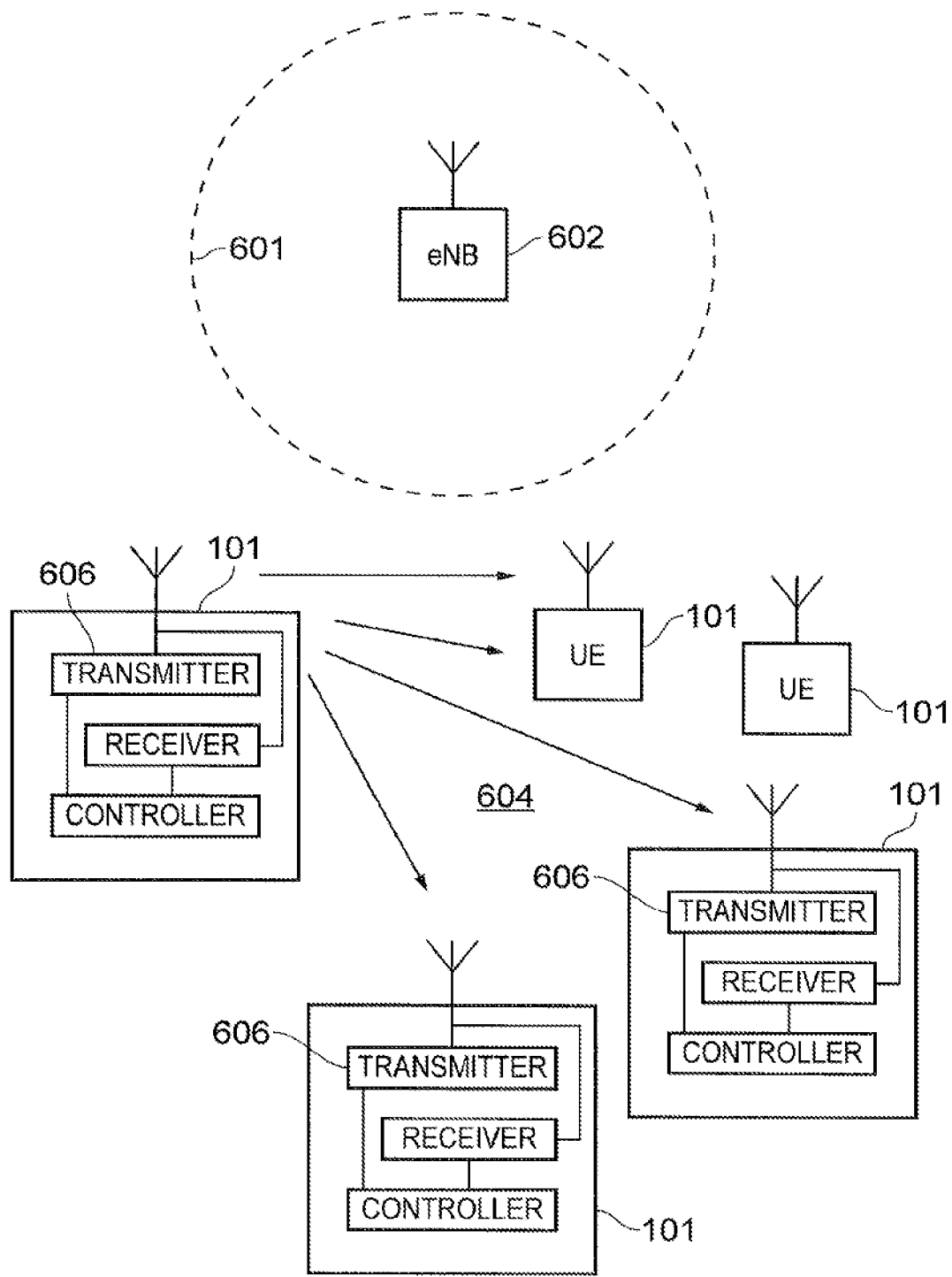
FIG. 6 provides a schematic block diagram illustrating an arrangement in which a plurality of communications devices form a group which perform device-to-device communications.

An example application is presented in FIG. 6. In FIG. 6, a plurality of communications devices 101 form a group of communications devices for which D2D communications is desired for the reasons explained above. As represented in FIG. 6, the communications devices 101 are outside a coverage area represented by a broken line 601 of a base station 602. As such the base station 602 cannot form or control any of the communications between the devices. However as mentioned above in some examples the group of communications devices may operate within a coverage area provided by the base station 602 and accordingly it is desirable that the transmission of signals by the communications devices 101 does not interfere with transmissions to or from the e-Node B 602 by conventional communications devices. As such, in some examples, a wireless access interface which is formed by the communications devices 101 for performing the D2D communications may utilise an uplink frequency of a conventional communications device. The wireless access interface can be arranged to transmit signals to the eNode B 602 when operating in a conventional mode, and to transmit and receive data via a mobile communications network of which the base station 602 forms a part.

As shown in FIG. 6, each of the UEs 101 includes a transmitter 606 and a receiver 608, which perform the transmission and reception of signals under the control of the controller 610. The controller 610 control the transmitter 606 and the receiver 608 to transmit and receive data between members of the group to perform D2D communications.

Figure 7:
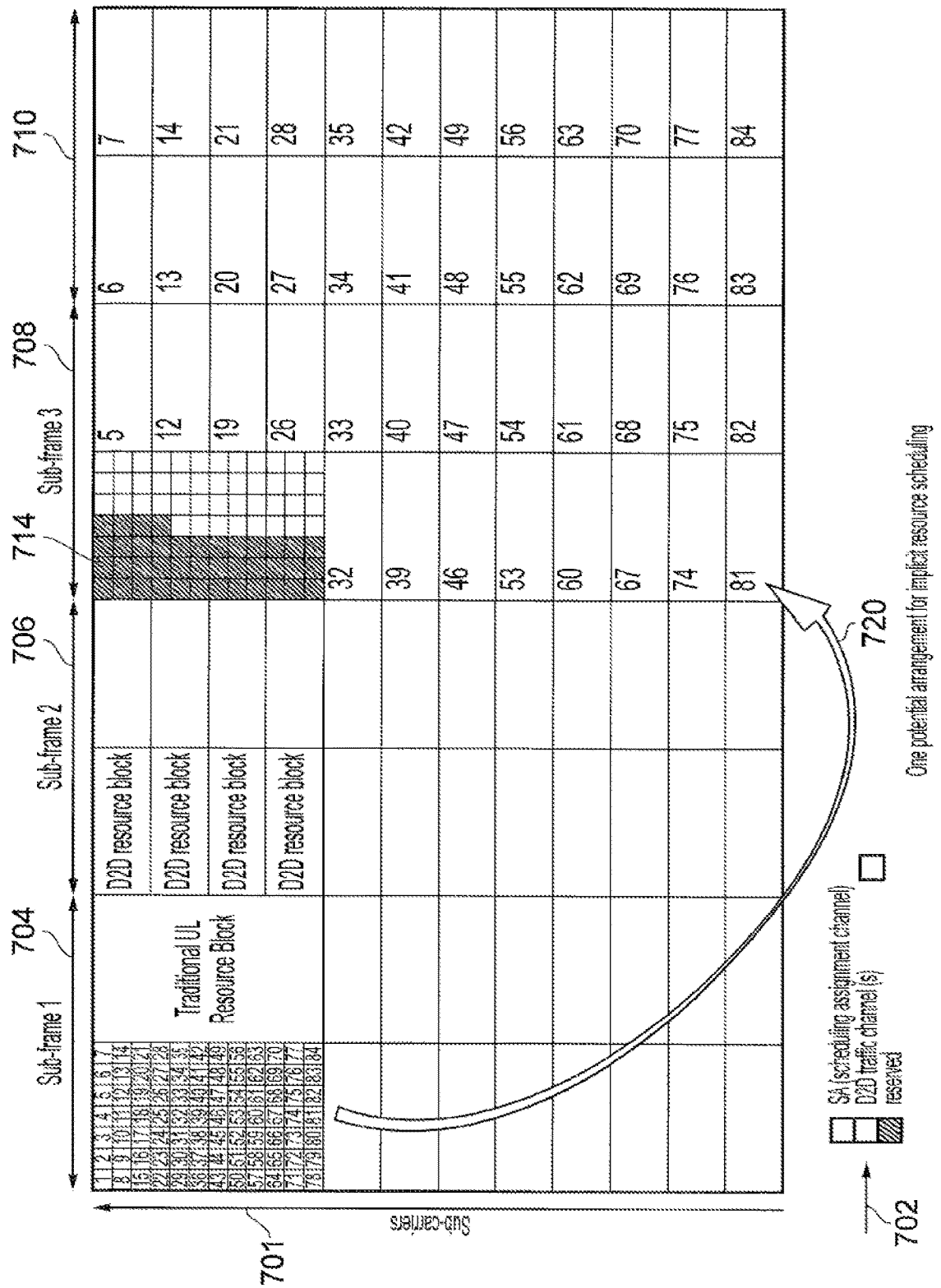
FIG. 7 is a schematic representation of a wireless access interface comprising a scheduling assignment region and regions shared communications resources and illustrating an operation in accordance with the present technique for supporting device-to-device communications.

A wireless access interface which is configured to provide an arrangement for D2D communications is presented in FIG. 7. In FIG. 7, the wireless access interface is formed from a plurality of OFDM sub carriers 701 and a plurality of OFDM symbols 702 which can be divided into sections of communications resources. As shown in FIG. 7, the wireless access interface is divided into time divided units of sub-frames 704, 706, 708, 710 of communications resource. As shown in FIG. 7, every other subframe includes a scheduling assignment region 712, 714. The scheduling assignment region includes a plurality of sections of communications resource which are numbered in FIG. 7 from 1 to 84. A remaining part of the subframe 704, 708 in which a scheduling assignment region 712, 714 is included is divided into a plurality of sections of shared communications resources. Other subframes in which there is no scheduling assignment region 712, 714 are divided into sections of shared communications resource for the transmission of signals representing data by the communications device to other communications devices within the group. However, in combination a plurality of sections of communications resources of shared resources are provided within two subframes 704, 706, 708, 710 and each of the sections of shared resource corresponds to one of the sections of the scheduling assignment region 712, 714. Accordingly, in accordance with the present technique, a transmission by a communications device in one of the sections of the scheduling assignment region of a scheduling assignment message indicates to the other communications devices within the group that the communications device which transmitted the scheduling assignment message in that section of the scheduling assignment region intends to transmit data in a corresponding section of the shared communications resources in which data can be transmitted. Thus as represented by the arrow 720, the transmission of a scheduling assignment in section 81 of the scheduling assignment region 712 provides an indication to the other communications devices in the group that the transmitting communications device that transmitted the scheduling assignment message intends to transmit data in the section numbered 81 of the scheduling assignment resource.

FIG. 7 therefore shows a potential arrangement for implicit resource scheduling. For the example shown in FIG. 7, the scheduling assignment resource or region 712 has been chosen to be one uplink resource block of a conventional LTE wireless access interface, transmitted every second subframe. However other configurations could be made as will be explained below. For simplicity, each traffic resource has been split into four device-to-device resource blocks. In some examples resource blocks for the device-to-device communications may not be the same as a conventional resource block for LTE. However as will be appreciated from the above explanation, each resource element of the scheduling assignment resource or region directly refers to a traffic resource block in the shared communications resources available to the D2D communications devices two subframes later. Accordingly, any communications device in the group of communications devices 604 or a scheduling communications device/eNodeB can use this scheduling assignment channel to indicate where it will transmit data.

In some examples, the scheduling assignment message may include one or more identifiers which may include but are not limited to an identifier of the transmitting communications device, an identifier of the destination device or devices, a logical channel identifier, transport channel identifier, and application identifier, or an identifier of the group of communications devices depending upon the application. For example if the group of communications devices were engaged in a push-to-talk communications session, then the scheduling assignment message would not need to identify the individual device, but only the group of communications devices. Other devices within the group, which detect the transmission of the scheduling assignment message in a section of the scheduling assignment region will know not to attempt to transmit in the corresponding section of the shared communications resources for transmitting data and will detect the identifier of the group of communications devices. The devices of the group will therefore know to listen and to receive the data transmitted by the transmitting communications devices (UE), which transmitted the scheduling assignment message, which included the group identifier.

As shown in FIG. 7 the resource numbered 81 corresponds to a region in the next available communications resource for that number that is in the third subframes 708. Thus there is a corresponding delay between transmission of the scheduling assignment message and the transmission of the data in order to provide notice to the other communications devices in the group that that particular section of the shared communications resources has been reserved by one of the communications devices for transmission.

The scheduling assignment message may in some examples include other information, for example information which is required for security, or information which identifies the type of content which will be sent in the shared resources such as discovery messages, or D2D voice or data traffic.

In some examples the scheduling assignment message transmitted by a communications device (UE), which intends to transmit data, may include an indication of a plurality of the sections of the shared communications resources in which it intends to transmit data. For example, the scheduling assignment message may include parameters N and M to schedule a block of N×M communications resource blocks from the shared communications resource channel. In one example the N×M resource blocks may indicated in the scheduling assignment message with respect to the section of the scheduling assignment region in which the message was transmitted. This can be achieved by pre-configuring the controllers in the communications devices to recognise that a scheduling assignment message providing the parameters N and M will identify that the N×M communications resources blocks starting from the corresponding section in the shared communications resources channel to the section in the scheduling assignment region in which the scheduling assignment message was transmitted.

Other Configurations of D2D Wireless Access Interface

As will be appreciated the arrangement of the wireless access interface of FIG. 7 for D2D communications by the group of devices shown is one example. There may also be other defined/fixed patterns of resource reservation that can be indicated with a resource element, which may span more than a just a few subframes and the scheduling assignment resource might take more than just one resource block.

Figure 8:
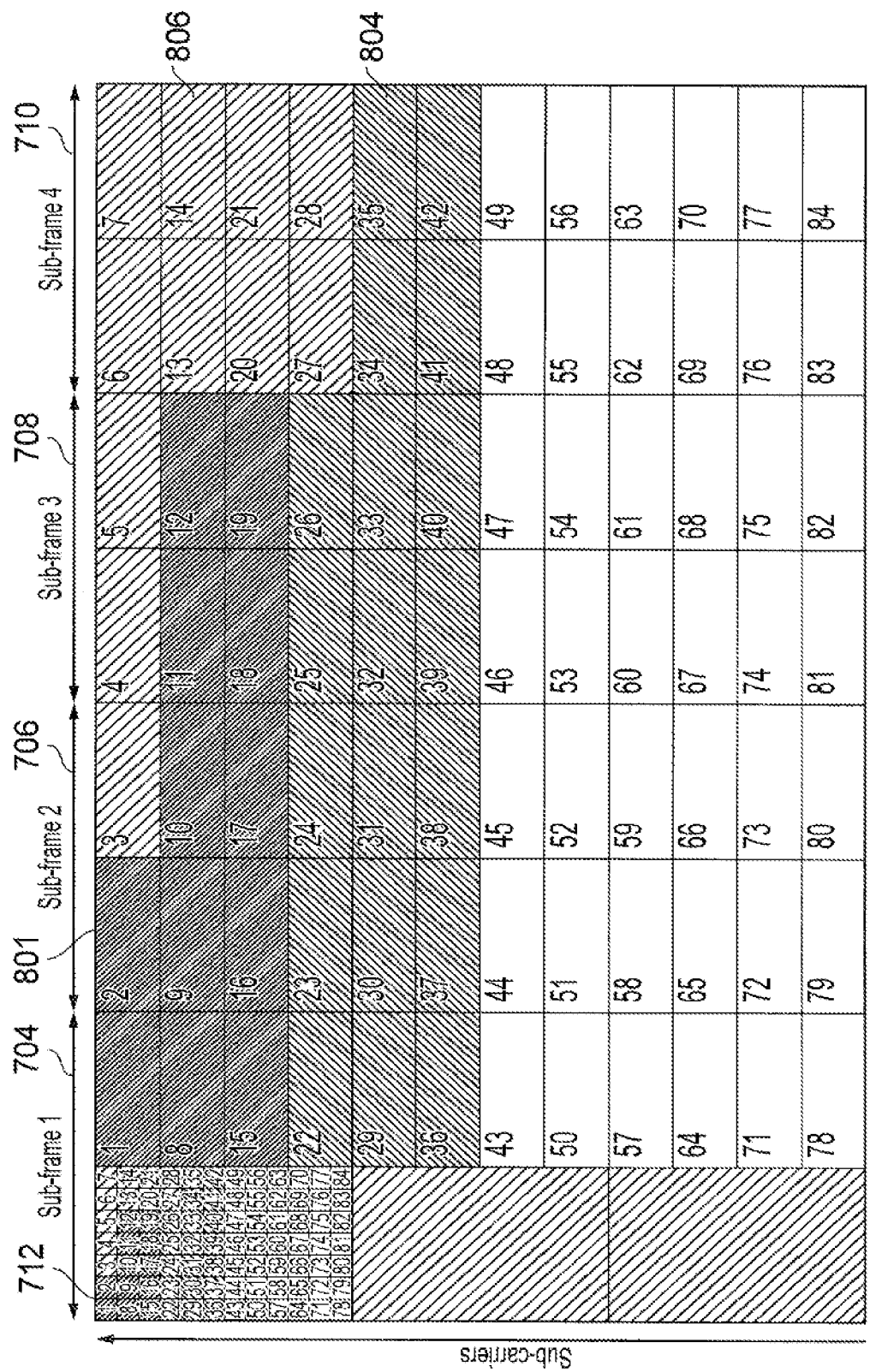
FIG. 8 is a schematic block diagram illustrating another arrangement of a wireless access interface in accordance with the present technique, for supporting device to device communications.

Another example is shown in FIG. 8 where corresponding sections of wireless access interface and features have corresponding reference numerals. In contrast to the arrangement showing in FIG. 7 the wireless access interface shown in FIG. 8 includes only a single scheduling assignment region 712 and correspondingly the regions of shared resource for which there is a corresponding section of the scheduling assignment region contain a greater amount of resources. In FIG. 8, examples are shown in which different communications devices reserve sections of resource of the shared communications resources channel by transmitting scheduling assignment messages in each of the sections of the scheduling assignment region. In the above FIG. 8, the entire resource block is used for scheduling individual D2D resource blocks for the next four subframes. For example, a first communications device transmits scheduling assignment messages in sections 1, 9, 10, 11, 12, 16, 17, 18, 19 as shown by the darkest sections 801 whereas a second communications device transmits a scheduling assignment messages in the sections 23, 24, 25, 26, 30, 31, 32, 33, 34, 35, 37, 38, 39, 40, 41, 42 reserving the corresponding sections 804 whereas a third communications device transmits scheduling assignment messages in sections 3, 4, 5, 6, 7, 13, 14, 20, 21, 27, 28 reserving the lighter coloured sections 806 of the shared communications channel. Two resource blocks remain unused in this case, which could contain other control information. This is perhaps not a likely way to split resources but is included as an illustrative example.

Figure 9:
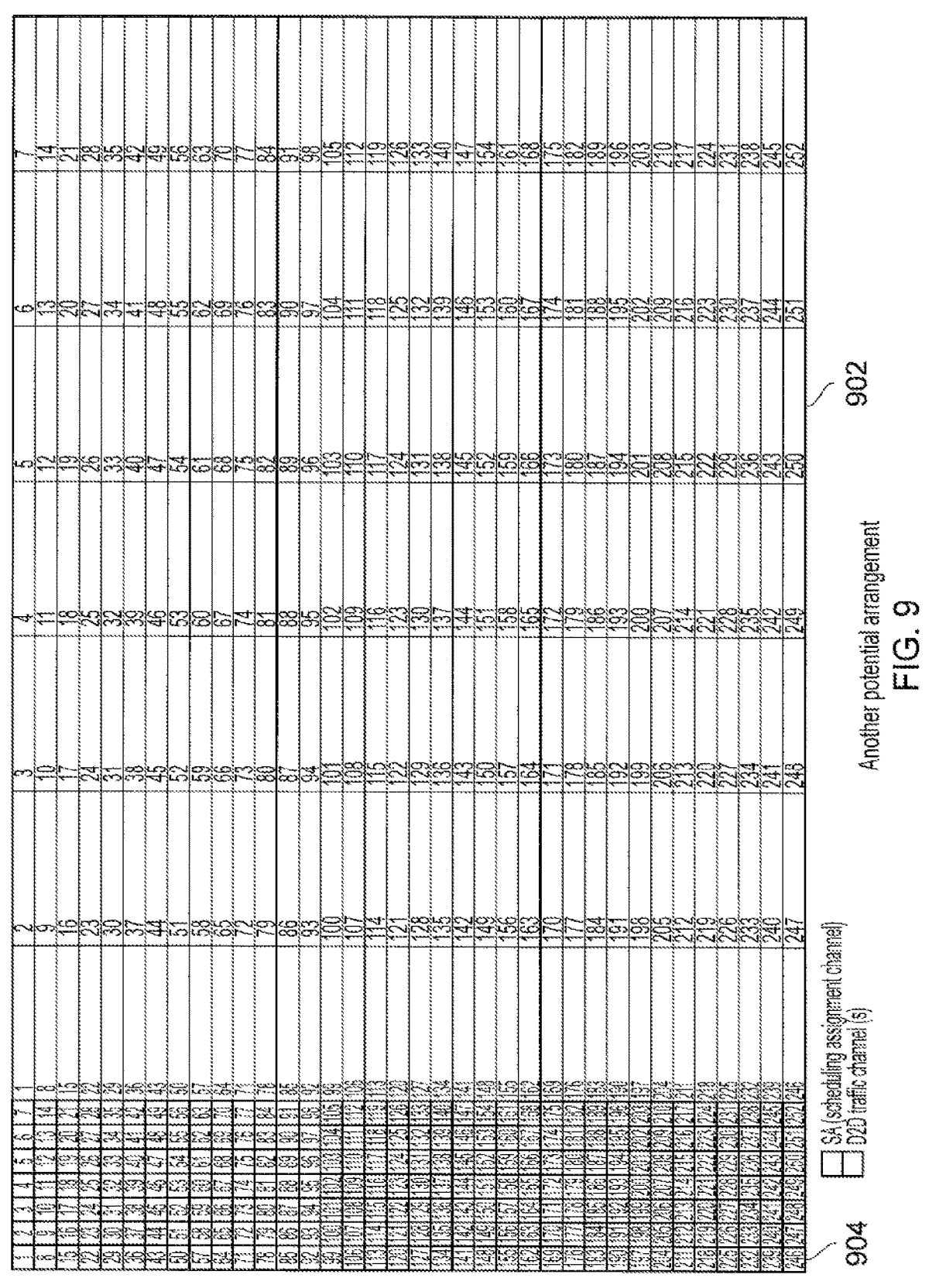

A further example arrangement is shown in FIG. 9 of a wireless access interface which corresponds to another example arrangement of the present technique. As shown in FIG. 9, resources in the shared uplink transmission channel are divided into sections 1 to 252 and the corresponding scheduling assignment region 901, 904 is divided into sections 1 to 252. In FIG. 9 another potential arrangement is shown, which allows more flexible scheduling. Each resource element in the scheduling channel corresponds to one traffic resource block. This means that the subcarrier containing the scheduling assignment region, and hence header information such as group identifier, will be the same sub-carrier where the traffic/payload part will be found. Although this is taking more of the available communications resources for scheduling information, it still provides the benefit that a UE can monitor with the scheduling assignment region with discontinuous reception (DRX) and hence save power, rather than having to monitor all data blocks. It also uses communications resources more efficiently by not requiring header information to be sent with every block of data, if the communications devices are configured to specify one resource element in the scheduling channel along with a block of M×N resource blocks, in which they intend to transmit data. As with the above examples it would be preferable to use the scheduling assignment messages to reserve several resource blocks rather than individual resource blocks, because this would be more efficient.

Contention Resolution

Embodiments of the present technique described above provide an arrangement in which a communication device can transmit a scheduling assignment message in preparation for transmitting data in a section of shared communications resources, which corresponds to the section of a scheduling assignment region in which the scheduling assignment message was transmitted. As will be appreciated there is a finite probability that one of the other devices may contemporaneously transmit a scheduling assignment message in the same scheduling assignment section and subsequently transmit signals representing the data being communicated in the corresponding section of the shared resources. In some example embodiments a contention resolution arrangement may be used in order to detect the transmission of signals contemporaneously by two or more communications devices of the group so that each of the communications devices of the group may retransmit their scheduling assignment message in another scheduling assignment section at a later subframe. In other examples the communications devices may accept the loss of the transmission of the data and high layer protocols may arrange for this data to be retransmitted. In other examples a collision avoidance mechanism may be deployed, in order to detect that a collision has occurred, so that a retransmission may be made. In some examples one or more of the communications devices of the group may transmit an indication that a collision has occurred, so that a re-transmission may be performed. For example a push-to-talk application allows users to detect when more than one user has attempted to transmit contemporaneously and the other users can request a re-transmission.

Embodiments of the present technique can provide an arrangement in which contention between communications devices for access to shared communications resources is reduced by combining a listening phase with a transmission and listening phase before transmitting signals representing data via those shared communications resources of a wireless access interface. During the listening phase a communications device monitors the one or more identified sections of the shared communications resources, which it has identified for transmitting the data.

According to example embodiments of the present technique, a communications device (UE) performs a listening/transmitting preamble phase before data transmission in order to reduce collision probability. Once the communications resources are reserved for a UE, scheduling resources are assigned for a number of N subframes, and during this time the UE performs one or more of a number of collision detection techniques including a two phase collision detection, random listening slot, incrementing and/or transmitting a counter value for scheduling assignment transmissions, re-starting collision detection, and a configurable detection phase length depending on number of potential transmitting UEs. An example embodiment is illustrated in FIGS. 10, 11, 12 and 13.

Figure 10:
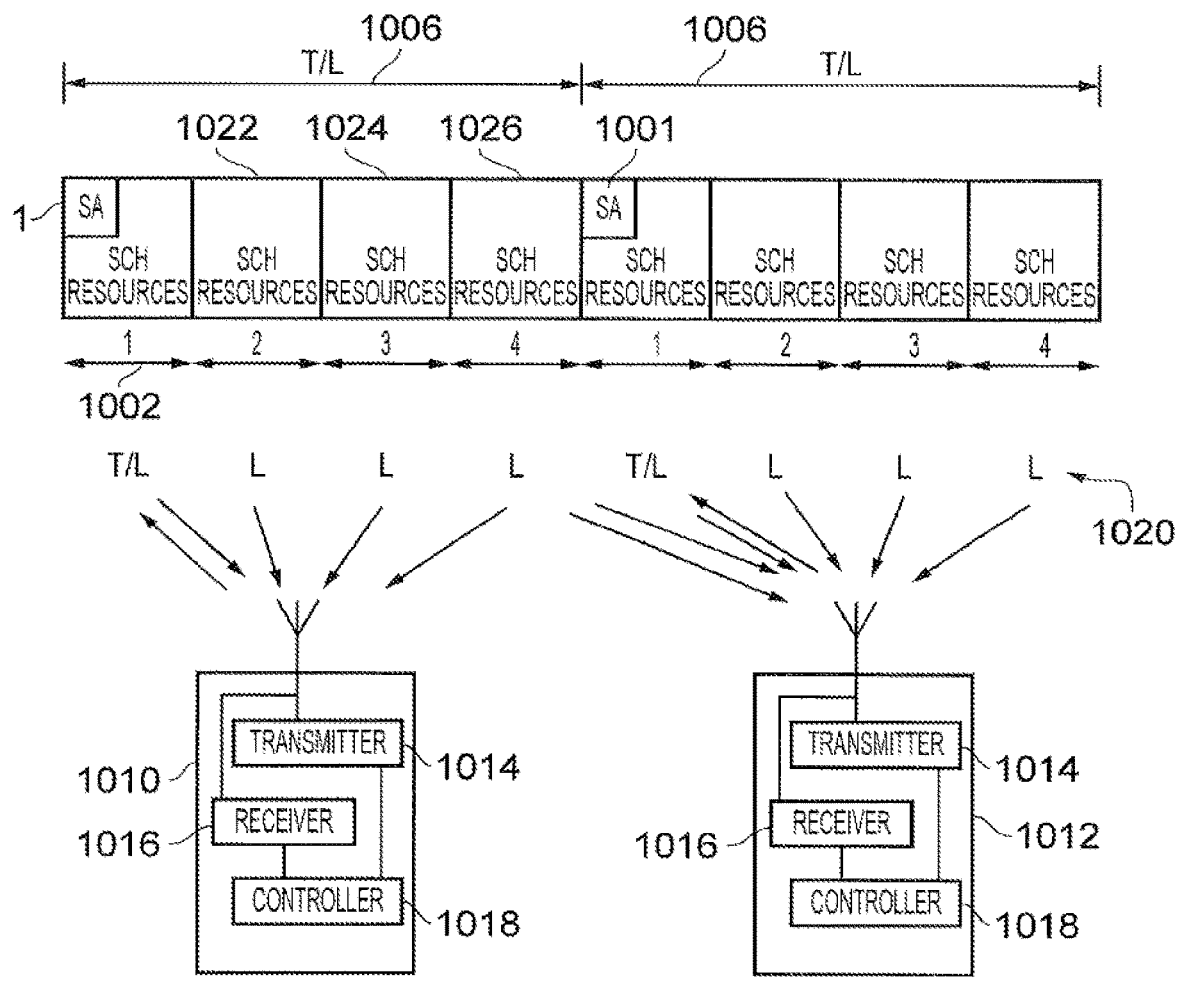
FIG. 10 is a schematic block diagram of a wireless access interface for supporting device-to-device communications, using a scheduling region, in which communications devices perform a contentious access for shared communications resources of a wireless access interface.

FIG. 10 provides an example deployment of a wireless access interface which includes a scheduling region or channel 1001 in one of a plurality of time divided units or subframes 1002 which are numbered 1, 2, 3, 4. The remaining subframe of a period 1006 provides subframes in which shared resources are provided for transmitting signals representing data to other UEs. In accordance with the example deployment shown in FIG. 10, four subframes are provided for each period in which one of the subframes contains a scheduling region or channel. As for the above example a UE which wishes to reserve one or more sections of shared communications resources from the remaining subframes transmits a message in the scheduling channel in a corresponding section to those of the sections of the communications resources which the UE intends to reserve.

As represented in FIG. 10, two or more UE's 1010, 1012 may contend for the shared resource as provided by the wireless access interface. Generally the shared communications resources are available for transmitting signals representing data but are contended for by the UE's 1010, 1012 in an uncontrolled manner.

As shown in FIG. 10, each of the UEs 1010, 1012 contain a transmitter 1014 and a receiver 1016, which perform the transmission and reception of signals under the control of the controller 1018 as explained below according to example embodiments of the present technique.

As will be appreciated during a contentious access phase for the UEs to access the shared resources of the subframes 1002, a UE may either be listening to receive either scheduling messages transmitted in a section of the scheduling channel or may receive signals representing data transmitted in corresponding sections of the shared communications resources. Thus, as represented by an indication or designation L representing listen or T representing transmission in a line 1020 the contending UEs 1010, 1012 may either listen to the sections of shared communications resource or the scheduling channel or may transmit a scheduling message in the scheduling channel 1001. Once however the UE has gained access or reserved the communications resources that it requires in the plurality of sections of shared communications resources, then the UE can transmit signals representing data via the wireless access interface to the other UE's which will be listening to those reserved resources.

In general however it will be appreciated that the shared communications resources are being contended for by the UE's 1010, 1012 and generally contention is resolved by transmitting signals within the communications resources which the UE needs to transmit the data. Any other UE which recognises that another UE is transmitting signals in those resources may stop preparations to transmit in those resources.

According to the present technique an arrangement is provided in which a UE performs a contention avoidance technique which reduces the likelihood of a contentious access for resources of the shared communications channel.

Figure 11:
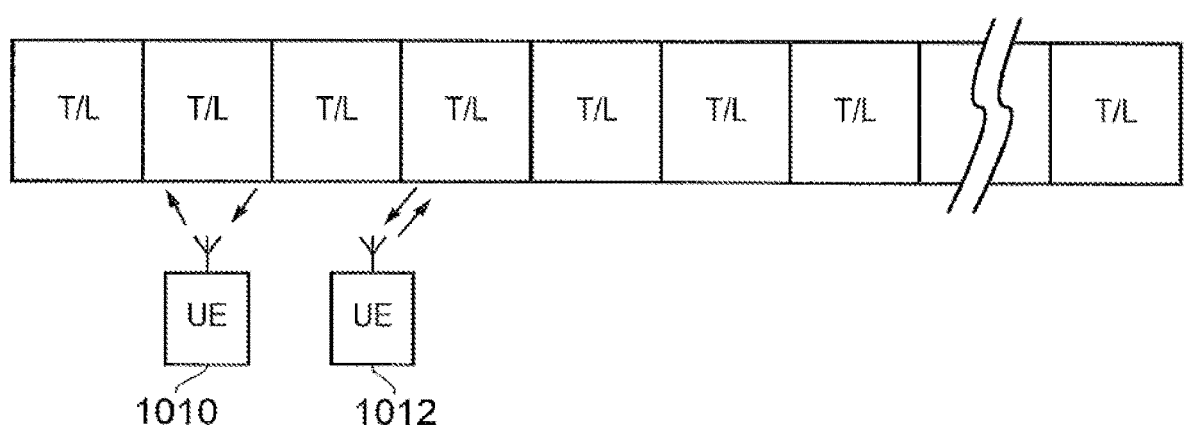
FIG. 11 is a schematic block diagram of a more general example of a wireless access interface for supporting device-to-device communications in which communications devices perform a contentious access for shared communications resources of a wireless access interface.
Figure 12:
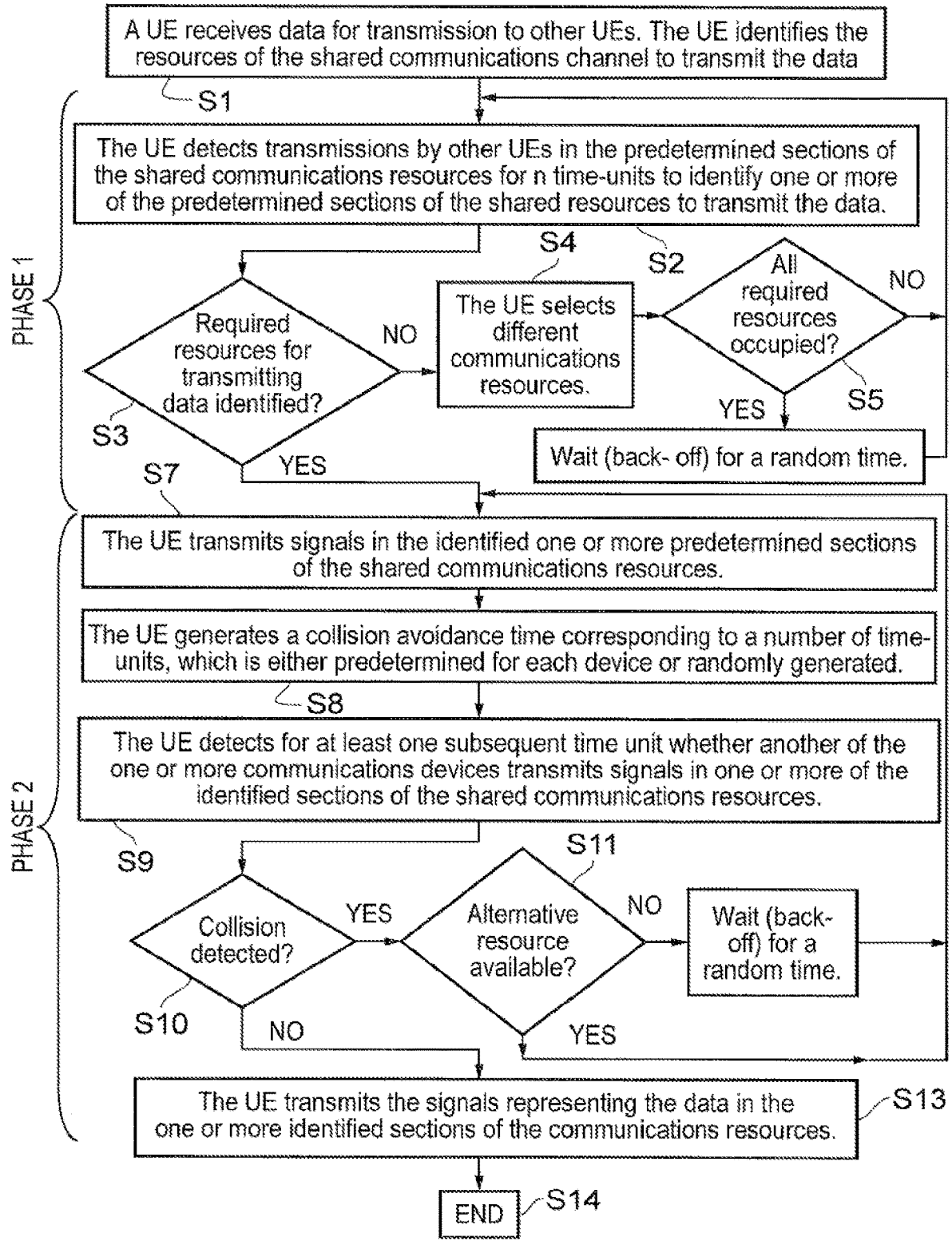
FIG. 12 is a flow diagram illustrating an example operation of a communications device performing contentious access in accordance with the present technique.

FIG. 11 represents a generalisation of the wireless access interface shown in FIG. 10. Generally, as will be appreciated from the above explanation, each of the sets of time divided units or subframes, which includes the three subframes of shared communications resources 1022, 1024, 1026 and the subframe 1002 which includes the scheduling channel 1001 forms a periodic unit or frame 1006 in which a UE 1010, 1012 can transmit signals in order to reserve sections of communications resource and transmits signals in those sections of communications resource in order to transmit data to other communications devices. Accordingly. FIG. 11 provides a generalisation in which each of the time divided units or subframes 1030 corresponds to one of the periodic frames 1026 of FIG. 10, because a communications device can either transmit or listen to transmissions from other communications devices representing transmission of signals representing the data. Thus, the generalisation shown in FIG. 11 does not specifically include the scheduling channel because there may be other mechanisms for requesting and reserving specific sections of the shared communications channel for the transmission of data in accordance with a contentious process.

As will be appreciated the representation of the wireless access interface for contentious transmission shown in FIG. 11 is a general representation and other forms of wireless access interface may be used. In one example, once a UE has transmitted in one or more sections of the shared communications resources in one of the time divided units 1030 then the other communications devices would assume that the UE will transmit signals for a plurality of the time divided units 1030.

As explained above, embodiments of the present technique can provide an arrangement in which communications devices in a contentious environment for accessing shared communications resources can reduce a likelihood of collision by combining a listening phase with a second phase of transmitting and listening. An example of a communications device operating in accordance with the present technique is presented by the flow diagram shown in FIG. 12, which is summarised as follows:

S1: A communications device (UE) receives data, which is to be transmitted to one or more others devices as explained above. The UE determines from the data which it is to transmit, how many of the predetermined sections of the shared communications resources it needs to transmit the data in each of one or more of the time units.

S2: The UE then identifies one or more of the predetermined sections of a shared communications resource of the wireless access interface for transmitting the data to the other UEs. The UE does this by detecting signals transmitted by one or more other UEs in the predetermined sections of the shared communications resource to identify one or more of the predetermined sections of the shared communications resources in which other UEs are not transmitting for n time units. However other UEs may also attempt to access the same resources contemporaneously.

S3: If the UE determines that it has identified the one or more sections of the communications resources it requires to transmit the data, then phase one of the process is completed and processing proceeds to step S7.

S4: Otherwise if the UE determines that one or more of the predetermined sections of the communications resources are currently being used by one or more other UEs then it selects a different set of the one or more sections of the communications resources and monitors those different sections to detect whether one or more UEs are transmitting in those resources for n time units.

S5: The UE determines whether it has monitored all of the sections of the communications resources from which it can identify the one or more sections of communications resources which are required to transmit the data. If the UE determines that it has not monitored all of the sections of communications resources to identify the one or more section of resources it requires then the process loops back to step S2.

S6: If the UE has monitored all of the sections of the communications resources from which it can identify the one or more sections of communications resources which are required to transmit the data, then the UE waits a predetermined time or a randomly selected time to back off from transmitting the data.

S7: After identifying the one or more of the sections of the shared communications resources which the UE needs to transmit the data, the UE, in a second phase, first transmits signals in the identified resources to reserve these resources for transmission.

S8: Contemporaneously with the transmission of the signals in the one or more identified sections of the communications resources, then UE generates a collision avoidance time. The collision avoidance time may be generated pseudo-randomly or the collision avoidance time may be predetermined, in which case each of the UEs in the group will be provided, as far as possible, with a different collision avoidance time. The collision avoidance time may correspond to a number m of the time divided units.

S9: After the collision avoidance timer has expired, during which the UE was transmitting signals in the identified communications resources of the shared channel for the collision avoidance time, the UE then monitors the identified communications resources in which it will transmit the data to detect transmissions by other UEs. Since all UEs are following the same procedure, each will begin to transmit and to continue transmitting until its collision avoidance timer expires. The UE therefore begins a collision avoidance timer to monitor is collision avoidance time whilst transmitting. By arranging for UEs in the group of UEs which are contending for the shared resources to have different collision avoidance times, and because the UEs transmit during the collision avoidance time, then two UEs will be able to detect that the other is transmitting, because each UE will stop transmitting to detect transmissions from other UEs at a different time. The UE may monitor the identified sections of the communications resources for a predetermined time such as for example a number of the time divided units, which may be fixed or randomly selected. If the UE's receiver does not detect the transmission of signals by another UE then it can determine that no collision has occurred. If however the UE detects signals transmitted by another UE then the UE concludes that another UE has performed a listening step as steps S2 to S6 and the transmitting steps S7 and S8 contemporaneously with the transmission of the UE itself. As will be appreciated, the likelihood of listening and transmitting contemporaneously with another UE is relatively low, the probability being reduced by making the selection of the collision avoidance time as different as possible so that UEs monitor the identified resources in different time units.

S10: The communications device then determines whether a collision has been detected or not following the listening step S9. If a collision has been detected in that the UE detects that another communications device is transmitting in at least one of the communications resources which either has attempted to transmit its data then processing proceeds to decision point S11. If a collision was not detected in that no other device is transmitting in at least one of the communications resources identified by the UE to transmit its data, then processing proceeds to step S13.

S11: The UE attempts to identify an alternative one or more sections of the communications resources it requires to transmit the data. If the UE does identify an alternative selection of one or more of the sections of communications resources which it needs to transmit its data, then processing proceeds to step S7. Otherwise if the UE determines that one or more of the predetermined sections of the communications resources are currently being used by one or more other UEs then at step S12 the UE performs a random back off in which it waits a randomly selected time or a random number of time divided units before proceeding again to step S7 in which the UE monitors the communications resources which it identified. Alternatively or additionally the UE may continue to monitor for a vacant resource until it determines on is available, upon which the UE will select that different set of communications resources and proceed to step S7.

S13: If a collision was not detected in step S10 after monitoring the communications resources which the UE has identified in step S9 then the UE proceeds to transmit the signals representing the data in the corresponding sections of the communications resources which it has identified for the transmission of the data to one or more other communications devices. The process then terminates at step S14.

Figure 13:
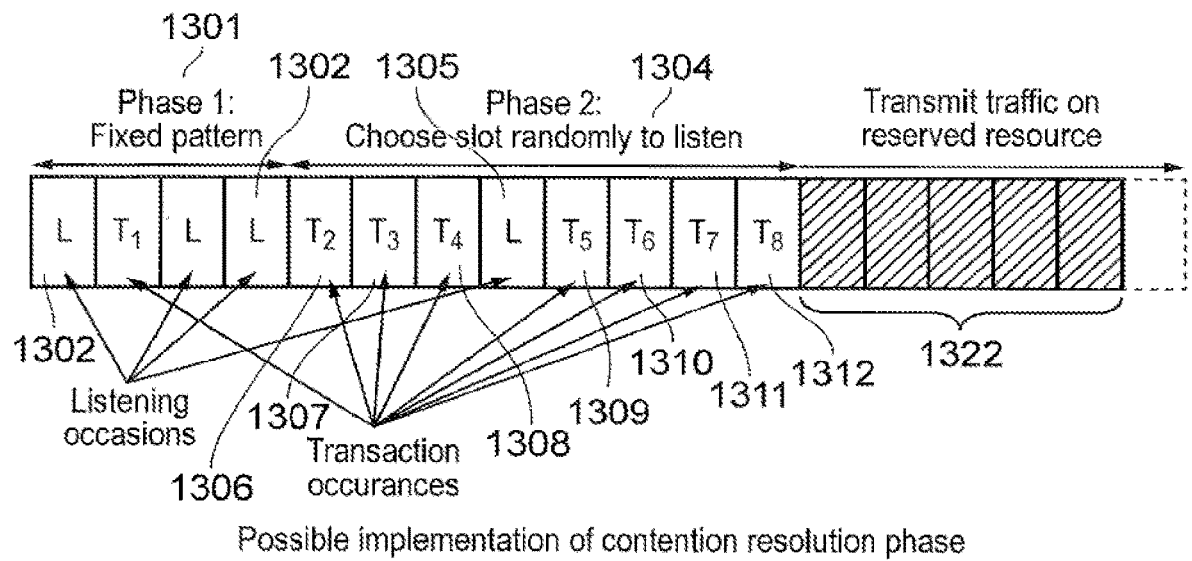
FIG. 13 is an illustrative representation of a further example of a wireless access interface in which communications devices perform contentious access for shared communications resources.

FIG. 13 provides a further representation of an example embodiment of the present technique. As shown in FIG. 13 in a first phase 1301 the UE monitors time divided sections of communications resources during which it listens to the communications resources which it has identified for transmitting its data. As represented by the letter "L" the UE performs a listening phase during these time divided units. However in the units identified with letter "T" the UE could transmit data in these sections of resource.

According to the arrangement shown in FIG. 13 in a first phase 1301 the UE listens to the communications resources, which it has identified as being required to transmit its data in first sections "L" of the wireless access interface. As a second phase 1304 the UE transmits in one of the time divided units identified "T" 1306, 1307, 1308, 1309, 1310, 1311, 1312. Accordingly, in the second phase 1304 the UE uses the randomly generated collision avoidance time to select a random one of the subframes 1305, to monitor the set of identified communications resources to determine whether another communications device or UE is transmitting in those identified resources. Thus the UE may continue to transmit in the other time divided units 1306, 1307, 1308 before the random selection of one of the time divided units to listen, according to the collision avoidance time, to monitor whether another communications device is contemporaneously transmitting. As explained above, if another UE is contemporaneously transmitting then the UE backs off by waiting for a predetermined time, or until a free resource is detected, before attempting to access the communications resources again. Otherwise if the UE does not detect that another UE is transmitting in the communications resources it intends to use to transmit data then the UE continues to transmit the signals in the remaining time divided units for the communications resources which is requires in a data transmission phase 1322.

The above example shows fixed six subframe preamble length for collision detection, before traffic resources are used. However there are other potential arrangements. For example there may be scheduling resources in every subframe along with data and this means the collision detection can start at any subframe. Alternatively, the scheduling subframes may occur periodically (e.g. one subframe in 8) and may be consecutive for a number of subframes, periodically (e.g. 6 subframes in every 32).

Figure 14:
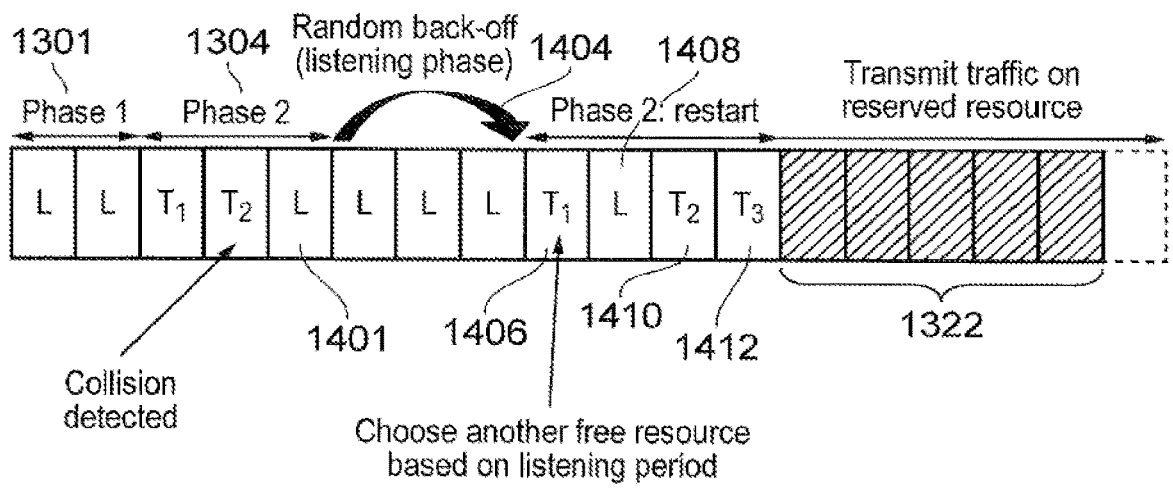
FIG. 14 is an illustrative representation of a further example of a wireless access interface in which communications devices perform contentious access for shared communications resources.

FIG. 14 presents an example embodiment corresponding to that shown in FIG. 13 except for this example a collision is detected during the listening sub-frame, which has been selected randomly according to the collision avoidance time. Thus corresponding reference numerals are applied to FIG. 14 and to those in FIG. 13 for corresponding operations. Thus in the first phase 1301 the UE listens to the communications resources which it intends to access during a listening phase in the subframe L. However, in the second phase in which the UE is transmitting first and then selects a random subframe to listen according to the randomly generated collision avoidance time, in a time divided unit 1401 the LIE detects a collision. Accordingly, by applying a random waiting time or determining the time by performing listening until any resource becomes available the UE backs off as represented by an arrow 1404 before attempting to re-transmit signals in the sections of communications resources which it has identified for transmitting its data after or during the listening during the back off phase. Thus in time limit 1406 the UE begins again to transmit signals followed by a listening section 1408 in which it listens to determine whether another UE has transmitted in the same communications resources, although the UE may continue transmitting in time units 1410, 1412. However in other examples once the UE has detected that another UE is transmitting in the listening time unit 1408 then it stops transmitting in the later time units 1410, 1412. If however another UE is transmitting in listening time unit L 1408, then the UE continues to transmit the signals representing its data in the reserved timeslots 1322.

For the example shown in FIG. 14 the UE listens for 1 sub-frame, and then chooses a free resource. The UE then picks one time slot out of four to listen, and transmits on the other timeslots. If UE detects a collision in this random time slot, it then waits and listens before attempting to use a different resource, repeating the selection of one random timeslot in four.

The collision avoidance time or any waiting time may be randomly generated in one example using predefined formula (i.e. pseudo-random, for example using a linear feedback shift register or a linear congruential formal). In another example the collision avoidance time or waiting time may be derived from time increment parameters (e.g. SFN, slot number). The random calculation may include the UE related additional parameters, like IMSI. UE-ID, Group ID, MAC-ID, Priority, which characterizes differences between UEs. The random sequence may reuse existing gold sequences or may define new algorithm (e.g. linear congruential method).

The purpose of this is to select different collision avoidance times among UEs, so that as far as possible different UEs have different collision avoidance times.

SUMMARY

As will be appreciated from the above example embodiments, the present technique can in some examples provide a two phase contention resolution process:

In a Phase 1: A fixed sequence of listening for resource reservations (and potentially listening also for on going data transmission or other information such as measurements from other UEs) or optionally in some example transmission of messages in a scheduling region.

If the UE detects the chosen resource is in use or being requested by another UE, the UE randomly picks another resource from the shared communications resources. The phase 1 may be repeated if the communications resources need to change.

This phase 1 solves collisions in most of the cases, with the exception being if two UE start listening at exactly the same subframe.

In Phase 2 the UE transmits in the selected communications resources or in the case in which a scheduling channel is present, the UE transmits a message to inform the other UEs that it intends to transmit in the corresponding communications resources of the shared channel. After a random time a further listening process is performed to determine whether a collision has occurred because another UE is transmitting contemporaneously.

The UE may restart one or both of the phases if collision is detected.

The UE may also perform random backoff time before restarting.

This phase 2 is intended to address the case in which two UEs start at exactly the same time, and contention is not detected in phase 1. The random listening slot reduces overall probability of collision, so that the larger the number of preamble frames the lower the probability of collision.

The network or a co-ordinating UE may configure the length of the preamble phase based on e.g. number of devices in proximity.

In some example a counter may be incremented after each scheduling message transmission if this example embodiment is used. This can help to determine which UE should choose another resource in case of collision, for example if a scheduling message from another UE is detected with a higher counter, or if the UE detects another UE in phase 2, then a different set of communications resources can be chosen.

After the UE transmits the signals representing the data then the UE may wait for a predetermined period or a random period before it makes an attempt to transmit further data to avoid collisions with other UEs.

Embodiments of the present technique can provide an arrangement which reduces a probability of collision between different transmitting UEs in proximity with one another compared to simply listening before transmitting. Furthermore a relatively short delay for collision detection (in order of a few subframes) can be achieved, and a configurable preamble length can provide a facility for addressing different numbers of UEs in the system. For example a longer preamble length (the total number of subframes in phases 1 and 2) may be needed in case of high number of UEs to reduce collision probability.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In the foregoing description D2D communications are described with reference to an LTE system, however the presently disclosed techniques are equally applicable to other LTE system structures and other systems which are compatible with D2D communications.

The invention claimed is:

1. A communications device, comprising:
    circuitry configured to:
        transmit signals to one or more other communications devices via a wireless access interface to perform device-to-device (D2D) communications;
        receive signals from the one or more other communications devices via the wireless access interface, wherein the wireless access interface includes a plurality of predetermined sections of shared communications resources in time divided units;
        identify one or more predetermined sections of the plurality of the predetermined sections of the shared communications resources for transmitting signals representing data for transmission to the one or more other communications devices, the identified one or more predetermined sections of the plurality of predetermined sections of the shared communications resources being those in which signals transmitted by the one or more other communications devices are not detected for a number of time divided units;
        transmit signals in the identified one or more predetermined sections of the shared communications resources for at least one of the time divided units;
        detect, after a collision avoidance time, for at least one subsequent time unit, whether another of the one or more communications devices transmits signals in the identified one or more predetermined sections of the shared communications resources; and
        if the circuitry does not detect another communications device transmitting in at least one of the identified one or more predetermined sections of the shared communications resources for the at least one subsequent time unit, transmit signals in the one or more identified sections of the shared communications resources, the signals representing the data being communicated to the one or more other communications devices.

2. The communications device of claim 1, wherein the circuitry is configured to:
    generate the collision avoidance time pseudo-randomly;
    after the pseudo-randomly generated collision avoidance time, which corresponds to one or more of the subsequent time units, detect whether another of the one or more communications devices transmits signals in one or more of the identified predetermined sections of the shared communications resources; and
    transmit the signals if signals transmitted by another of the communications devices are not detected.

3. The communications device of claim 1, wherein the circuitry is configured to:
    transmit the signals in the identified one or more predetermined sections of the shared communications resources during the collision avoidance time; and
    after the collision avoidance time, not transmit the signals to perform the detecting whether another of the one or more communications devices transmits signals in one or more of the identified predetermined sections of the shared communications resources.

4. The communications device of claim 1, wherein the circuitry is configured to:
identify one or more other sections of the plurality of predetermined sections of shared communications resources than the identified sections of the communications resources which were first identified to transmit the signals representing data to one or more other communications device, if signals are transmitted by another of the communications devices in one or more of the identified predetermined sections of the shared communications resources in the at least one subsequent time unit are detected; and
if one or more other sections of the predetermined sections of the communications resources are identified, transmit the signals in the identified one or more other predetermined sections of the shared communications resources for at least one of the time divided units;
after the collision avoidance time, detect for at least one subsequent time unit whether another of the one or more communications devices transmits signals in one or more of the identified other sections of the shared communications resources; and
if signals transmitted by another of the communications devices are not detected for the at least one subsequent time unit, transmit the signals in the one or more identified other sections of the shared communications resources.

5. The communications device of claim 1, wherein the circuitry is configured to
if one or more other sections of the predetermined sections of the communications resources cannot be identified, wait for at least one time-unit, and after waiting, detect again whether another of the one or more communications devices is transmitting signals in one or more of the identified sections of the shared communications resources in at least one time divided unit; and
if signals transmitted by another of the communications devices are not detected for the at least one time divided unit, transmit the signals in the one or more identified sections of the shared communications resources, or
identify the one or more other sections of the plurality of predetermined sections of shared communications resources than the identified sections of the communications resources which were first identified to transmit the signals representing data.

6. The communications device of claim 1, wherein the circuitry is configured to:
generate a pseudo-random waiting time of at least one time divided unit; and
wait for the pseudo-random waiting time, before detecting again whether another of the one or more communications devices is transmitting signals in one or more of the identified sections of the shared communications resources in at least one time divided unit.

7. The communications device of claim 1, wherein the circuitry is configured to identify the one or more predetermined sections of the plurality of predetermined sections of shared communications resources of the wireless access interface for transmitting the signals representing the data by
detecting whether one or more others of the one or more communications devices is transmitting signals in the predetermined sections of the shared communications resources in one or more time divided units, and if signals are not detected in one or more of the predetermined sections of the shared communications resources, which are required for transmitting the data, identifying the one or more predetermined sections of the plurality of predetermined sections of shared communications resources for transmitting the signals representing the data from the one or more predetermined sections of the shared communications resources in which the other communications devices are not transmitting signals in accordance with the data for transmission.

8. The communications device of claim 7, wherein the circuitry is configured to identify the one or more predetermined sections of the plurality of predetermined sections of shared communications resources of the wireless access interface for transmitting the signals representing the data by
detecting whether one or more others of the one or more communications devices is transmitting signals in the predetermined sections of the shared communications resources in one or more time divided units, and if signals are detected in one or more of the predetermined sections of the shared communications resources, which are required for transmitting the data, and then
waiting for at least one time-unit, and after waiting, detecting again whether one or more others of the communications devices are transmitting signals in the predetermined sections of the shared communications resources in at least one time divided unit, and then performing the identifying the one or more predetermined sections of the shared communications resources in which the other communications devices are not transmitting signals in accordance with the data for transmission.

9. The communications device of claim 8, wherein the circuitry is configured to:
generate a pseudo-random waiting time of at least one time divided unit; and
wait for the pseudo-random waiting time, and then detect again whether one or more others of the one or more communications devices is transmitting signals in one or more of the identified sections of the shared communications resources in at least one time divided unit.

10. The communications device of claim 1, wherein
the wireless access interface includes a scheduling region in the time divided units which are separated by at least one time divided unit, which includes one or more of the plurality of predetermined sections of the shared communications resources and in combination with the time divided unit which includes the scheduling region, provides repeating periodic sections of the wireless access interface, the scheduling region providing a plurality of predetermined sections which correspond to the plurality of the predetermined sections of the shared communications resources so that transmitting a message in one of the predetermined sections of the scheduling region indicates to other communications devices that corresponding one or more predetermined sections of the plurality of the shared communications resource will be used for transmitting signals representing the data by the communications device, and
the circuitry is configured to detect whether another of the one or more communications devices has transmitted a message in one or more predetermined sections of the scheduling region which correspond to the identified one or more predetermined sections of the shared communications resources, and if the signals transmitted by another of the communications devices are not detected,
  transmit a message in one or more predetermined sections of the scheduling region corresponding to the identified one or more predetermined sections of the shared communications resources; and
  transmit the signals in the one or more identified sections of the shared communications resources.

11. The communications device of claim 10, wherein the circuitry is configured to detect for at least one subsequent time unit whether another of the one or more communications devices transmits signals in one or more of the identified sections of the shared communications resources, by detecting whether another of the one or more communications devices has transmitted a message in one or more predetermined sections of the scheduling region which correspond to the identified one or more predetermined sections of the shared communications resources.

12. The communications device of claim 10, wherein the circuitry is configured to detect for at least one subsequent time unit whether another of the one or more communications devices transmits signals in one or more of the identified sections of the shared communications resources, by detecting whether another of the one or more communications devices is transmitting signals in the identified one or more predetermined sections of the shared communications resources.

13. Circuitry configured to be implemented in a communications device, the circuitry configured to:
  transmit signals to one or more other communications devices via a wireless access interface to perform device-to-device (D2D) communications;
  receive signals from the one or more other communications devices via the wireless access interface, wherein the wireless access interface includes a plurality of predetermined sections of shared communications resources in time divided units;
  identify one or more predetermined sections of the plurality of the predetermined sections of the shared communications resources for transmitting signals representing data for transmission to the one or more other communications devices, the identified one or more sections of the plurality of predetermined sections of the shared communications resources being those in which signals transmitted by the one or more other communications devices are not detected for a number of time divided units;
  transmit signals in the identified one or more predetermined sections of the shared communications resources for at least one of the time divided units;
  detect, after a collision avoidance time, for at least one subsequent time unit, whether another of the one or more communications devices transmits signals in the identified one or more predetermined sections of the shared communications resources; and
  if the circuitry does not detect another communications device transmitting in at least one of the identified one or more predetermined sections of the shared communications resources for the at least one subsequent time unit, transmit signals in the one or more identified sections of the shared communications resources, the signals representing the data being communicated to the one or more other communications devices.

14. A method performed by circuitry of a communications device, the method comprising:
  transmitting signals to one or more other communications devices via a wireless access interface to perform device-to-device (D2D) communications;
  receiving signals from the one or more other communications devices via the wireless access interface, wherein the wireless access interface includes a plurality of predetermined sections of shared communications resources in time divided units;
  identifying one or more predetermined sections of the plurality of the predetermined sections of the shared communications resources for transmitting signals representing data for transmission to the one or more other communications devices, the identified one or more sections of the plurality of predetermined sections of the shared communications resources being those in which signals transmitted by the one or more other communications devices are not detected for a number of time divided units;
  transmitting signals in the identified one or more predetermined sections of the shared communications resources for at least one of the time divided units;
  detecting, after a collision avoidance time, for at least one subsequent time unit, whether another of the one or more communications devices transmits signals in the identified one or more predetermined sections of the shared communications resources; and
  if another communications device transmitting in at least one of the identified one or more predetermined sections of the shared communications resources for the at least one subsequent time unit is not detected, transmitting signals in the one or more identified sections of the shared communications resources, the signals representing the data being communicated to the one or more other communications devices.

15. The circuitry of claim 13, wherein the circuitry is configured to:
  generate the collision avoidance time pseudo-randomly;
  after the pseudo-randomly generated collision avoidance time, which corresponds to one or more of the subsequent time units, detect whether another of the one or more communications devices transmits signals in one or more of the identified predetermined sections of the shared communications resources; and
  transmit the signals if signals transmitted by another of the communications devices are not detected.

16. The circuitry of claim 13, wherein the circuitry is configured to:
  transmit the signals in the identified one or more predetermined sections of the shared communications resources during the collision avoidance time; and
  after the collision avoidance time, not transmit the signals to perform the detecting whether another of the one or more communications devices transmits signals in one or more of the identified predetermined sections of the shared communications resources.

17. The circuitry of claim 13, wherein the circuitry is configured to:
  identify one or more other sections of the plurality of predetermined sections of shared communications resources than the identified sections of the communications resources which were first identified to transmit the signals representing data to one or more other communications device, if signals are transmitted by another of the communications devices in one or more of the identified predetermined sections of the shared communications resources in the at least one subsequent time unit are detected; and if one or more other sections of the predetermined sections of the communications resources are identified,
transmit the signals in the identified one or more other predetermined sections of the shared communications resources for at least one of the time divided units;
after the collision avoidance time, detect for at least one subsequent time unit whether another of the one or more communications devices transmits signals in one or more of the identified other sections of the shared communications resources; and
if signals transmitted by another of the communications devices are not detected for the at least one subsequent time unit, transmit the signals in the one or more identified other sections of the shared communications resources.

18. The circuitry of claim 13, wherein the circuitry is configured to:
if one or more other sections of the predetermined sections of the communications resources cannot be identified, wait for at least one time-unit, and after waiting, detect again whether another of the one or more communications devices is transmitting signals in one or more of the identified sections of the shared communications resources in at least one time divided unit; and
if signals transmitted by another of the communications devices are not detected for the at least one time divided unit, transmit the signals in the one or more identified sections of the shared communications resources, or
identify the one or more other sections of the plurality of predetermined sections of shared communications resources than the identified sections of the communications resources which were first identified to transmit the signals representing data.

19. The circuitry of claim 13, wherein the circuitry is configured to:
generate a pseudo-random waiting time of at least one time divided unit; and
wait for the pseudo-random waiting time, before detecting again whether another of the one or more communications devices is transmitting signals in one or more of the identified sections of the shared communications resources in at least one time divided unit.

20. The circuitry of claim 13, wherein the circuitry is configured to identify the one or more predetermined sections of the plurality of predetermined sections of shared communications resources of the wireless access interface for transmitting the signals representing the data by
detecting whether one or more others of the one or more communications devices are transmitting signals in the predetermined sections of the shared communications resources in one or more time divided units, and if signals are not detected in one or more of the predetermined sections of the shared communications resources, which are required for transmitting the data,
identifying the one or more predetermined sections of the plurality of predetermined sections of shared communications resources for transmitting the signals representing the data from the one or more predetermined sections of the shared communications resources in which the other communications devices are not transmitting signals in accordance with the data for transmission.

* * * * *